United States Patent
Van Beirendonck

(10) Patent No.: US 12,500,733 B2
(45) Date of Patent: Dec. 16, 2025

(54) METHOD FOR ACCELERATING BOOTSTRAPPING IN A CRYPTOGRAPHIC APPLICATION

(71) Applicant: KATHOLIEKE UNIVERSITEIT LEUVEN, Leuven (BE)

(72) Inventor: Michiel Van Beirendonck, Leuven (BE)

(73) Assignee: Belfort Labs BV, Leuven (BE)

( * ) Notice: Subject to any disclaimer, the term of this patent is extended or adjusted under 35 U.S.C. 154(b) by 210 days.

(21) Appl. No.: 18/515,914

(22) Filed: Nov. 21, 2023

(65) Prior Publication Data

US 2025/0167976 A1    May 22, 2025

(51) Int. Cl.
*H04L 9/00* (2022.01)
*H04L 9/08* (2006.01)

(52) U.S. Cl.
CPC .......... *H04L 9/008* (2013.01); *H04L 9/0877* (2013.01)

(58) Field of Classification Search
CPC .............................. H04L 9/008; H04L 9/0877
See application file for complete search history.

(56) References Cited

U.S. PATENT DOCUMENTS

| | | | | |
|---|---|---|---|---|
| 9,716,590 | B2 * | 7/2017 | Gentry | H04L 9/3093 |
| 11,101,999 | B2 * | 8/2021 | Leavy | H04L 9/0643 |
| 11,277,257 | B2 * | 3/2022 | Kim | H04L 9/008 |
| 11,374,736 | B2 * | 6/2022 | Gao | H04L 9/3093 |
| 11,394,525 | B2 * | 7/2022 | Georgieva | H04L 9/3013 |
| 11,405,202 | B2 * | 8/2022 | Pan | H04L 9/0894 |
| 11,539,504 | B2 * | 12/2022 | Na | H04L 9/008 |
| 11,575,672 | B2 * | 2/2023 | Yitbarek | H04L 9/3247 |
| 12,024,103 | B2 * | 7/2024 | Schindler | G06F 21/32 |
| 12,355,873 | B1 * | 7/2025 | Chase | G06F 21/72 |
| 2021/0143984 | A1 * | 5/2021 | Han | H04L 9/083 |
| 2023/0379136 | A1 * | 11/2023 | Veneroso | H04L 9/008 |
| 2024/0171371 | A1 * | 5/2024 | Bottleson | H04L 9/0618 |
| 2024/0259180 | A1 * | 8/2024 | Joye | H04L 9/008 |
| 2024/0388431 | A1 * | 11/2024 | Holzbaur | H04L 9/3093 |

(Continued)

OTHER PUBLICATIONS

Ducas, L. et al., "FHEW: Bootstrapping homomorphic encryption in less than a second", Eurocrypt, pp. 617-640, 2015.

(Continued)

*Primary Examiner* — Iral S Lakhia

(74) *Attorney, Agent, or Firm* — Workman Nydegger

(57) ABSTRACT

A method for performing a bootstrapping operation in cryptographic application, includes receiving in an accelerator one or more input ciphertexts used in the cryptographic application to be bootstrapped and iteratively processing one or more accumulator variables in function of portions of the input ciphertexts; multiplying, within each iteration, the processed accumulator variables with a bootstrapping key element belonging to a bootstrapping key comprising a plurality of bootstrapping key elements, said bootstrapping key element taken from a bootstrapping cache memory in the accelerator; while performing the multiplying for each of the one or more accumulator variables in turn, loading into the bootstrapping cache memory from an external memory a next bootstrapping key element of the plurality of bootstrapping key elements to be used in a next iteration of the bootstrapping operation.

16 Claims, 2 Drawing Sheets

(56) References Cited

U.S. PATENT DOCUMENTS

2025/0055671 A1* 2/2025 Soriente ............... H04L 9/008

OTHER PUBLICATIONS

Chillotti, I. et al., "TFHE: Fast Fully Homomorphic Encryption Over the Torus", Journal of Cryptology 33, 34-91, 2020.

Jiang, L. et al., "MATCHA: A fast and energy-efficient accelerator for fully homomorphic encryption over the torus", ACM/IEEE DAC, pp. 235-240, 2022.

Ye, T. et al., "FPGA acceleration of fully homomorphic encryption over the torus" IEEE HPEC, pp. 1-7, 2022.

* cited by examiner

METHOD FOR ACCELERATING BOOTSTRAPPING IN A CRYPTOGRAPHIC APPLICATION

FIELD OF THE INVENTION

The present invention is generally related to the field of cryptography. More in particular, the invention relates to solutions for accelerating a bootstrapping operation.

BACKGROUND OF THE INVENTION

Machine Learning (ML), driven by the availability of an abundance of data, has seen rapid advances in recent years, leading to new applications from autonomous driving to medical diagnosis. In many applications, ML models are developed by one party, who makes them available to users as a cloud service. In such a context of cloud computing, for example, users run a certain risk when uploading raw data to untrusted cloud servers. Therefore, it is required that sufficient security be provided to protect the users' data. A promising new technology that has emerged in the field of data security is Fully Homomorphic Encryption (FHE), which allows one to perform homomorphic computations on encrypted data (ciphertext) without learning further information about that data. In other words, it is not required to first decrypt the data. So, a client encrypts data with FHE before sending it to the cloud. The cloud service then computes an FHE program on the encrypted data without obtaining any information about the input and sends the (still encrypted) result back to the client. Only the client can finally decrypt and obtain the result. Methods to perform FHE have been improved over the years up to the point that practical application has become possible.

FHE algorithms are often executed on cloud compute servers.

Computations are however slow, even several orders of magnitude slower than unencrypted calculations. This remains so today, in spite of the significant improvements to FHE schemes and algorithms in recent years. To work around the speed limitations of FHE, designers have shifted their focus from general-purpose CPUs to more dedicated hardware implementations. For example, ASIC emulations in advanced technology nodes promise better FHE acceleration, but it can take years for these ASICs to be fabricated and become available. Moreover, they are typically specialized for a limited range of parameter sets. FPGA-based implementations can be developed more quickly than ASIC implementations, are flexible to change parameter sets, and can be readily deployed in FPGA-equipped cloud instances while boosting large speedups. As a result, they have been a popular target for FHE acceleration.

Typically, execution of a FHE scheme is bottlenecked by the so-called bootstrap procedure. FHE ciphertexts include noise into the encryption for security purposes. Further, each FHE operation increases the noise present in the ciphertext. FHE is tolerant to this noise as long as a certain threshold noise level is not exceeded. Therefore, a FHE scheme has to periodically invoke a bootstrapping procedure, which decreases the amount of noise in the ciphertext so that one remains below the threshold noise level and further calculations can be performed. Bootstrapping is one of the costly operations in FHE calculations.

The main cost of bootstrapping, and thus in FHE schemes in general, lies in polynomial multiplications. The ciphertext data on which computations are performed in a FHE scheme, are large polynomials (length N) from a certain scheme-dependent polynomial ring. Typical operations on these polynomials include addition and multiplication. While addition is linear in the length of the polynomial ($O(N)$ operations), multiplication has a quadratic cost ($O(N^2)$ operations) when using a generic straightforward technique, also known as schoolbook multiplication.

As one of the costliest operations of the FHE scheme is the multiplication, speeding up the multiplication operation may substantially contribute to a reduction of the computational overhead. Various well-studied algorithms are available to speed up such multiplication. This can be achieved by exploiting specific properties of the polynomials using multiplication algorithms such as Toom-Cook multiplication, Karatsuba multiplication or the Fast Fourier Transform (FFT) for fast polynomial multiplication, where typically FFT is the fastest option.

Polynomial multiplication using FFTs is not exact and can introduce a certain noise in the calculations. Quantization noise may arise from the fact that an FFT works with real numbers and is approximated with floating-point or fixed-point representations. As explained above, all currently available FHE schemes have an inherent noise that is increased with each operation. The additional FFT quantization noise adds to the noise inherent to the FHE scheme but can be tolerated to some extent. However, as set out above, too much noise causes bootstrapping to fail, and as such, the use of the FFT requires very careful treatment.

Two relevant FHE schemes are the FHEW scheme as disclosed in the paper "FHEW: Bootstrapping homomorphic encryption in less than a second" (L. Ducas et al., Eurocrypt, pp. 617-640, 2015) and the TFHE scheme described in "TFHE: Fast Fully Homomorphic Encryption Over the Torus" (I. Chillotti et al., J. Cryptol. 33, 34-91, 2020). FHEW and TFHE both enable the use of homomorphic Boolean algebra, e.g., NAND, XOR and XNOR logic gates apart from homomorphic additions and multiplications.

Schemes like TFHE and FHEW have revisited the bootstrapping approach, making it cheaper but inherently linked to homomorphic calculations. In these schemes most of the homomorphic operations require an immediate bootstrap of the ciphertext, i.e., after every encrypted gate. Compared to earlier generation FHE schemes they feature much faster bootstrapping algorithms. Moreover, bootstrapping in TFHE is a versatile tool, which can additionally be "programmed" with an arbitrary function that is applied to the ciphertext, e.g., non-linear activation functions in ML neural networks. This approach is called Programmable Bootstrapping (PBS), which constitutes the main cost of TFHE homomorphic calculations. Taking up to 99% of an encrypted gate computation (encrypted NAND, XOR, XNOR, . . . ), PBS is a prime target for high-throughput hardware acceleration of TFHE.

Some more detailed information on the Torus Fully Homomorphic Encryption (TFHE) scheme and its working is provided. Torus Fully Homomorphic Encryption is a homomorphic encryption scheme based on the Learning With Errors (LWE) problem. It operates on elements that are defined over the real Torus $\mathbb{T}=\mathbb{R}/\mathbb{Z}$, i.e., the set $[0, 1)$ of real numbers modulo 1. In practice, Torus elements are often discretized as 32-bit or 64-bit integers. A TFHE ciphertext can be constructed by combining three elements: a secret vector s with k coefficients following a uniform binary distribution, a public vector a sampled from a uniform distribution, and a small error e. A message $\mu \in \mathbb{T}$ can be encrypted as a tuple: $c=(a, b=a \cdot s+e+\mu)$. Using the secret s, one can decrypt the ciphertext back into (a noisy version of)

the message by computing b−a·s=μ+e. This type of ciphertext is called a Torus LWE (TLWE) ciphertext.

TFHE additionally describes two variant ciphertexts. First, there is a generalized version (TGLWE), where e and μ are polynomials in $\mathbb{T}_N[X]=\mathbb{T}[X]/(X^N+1)$ (with N the order of the polynomials), and where a and s are vectors of polynomials of the form $\mathbb{T}_N[X]^k$. The TGLWE ciphertext is then similarly formed as a tuple: c=(a, b=a·s+e+u)∈ $\mathbb{T}_N[X]^{k+1}$. The second variant is a generalized version of a GSW (Gentry, Sahai and Waters) ciphertext (TGGSW), which is essentially a matrix where each row is a TGLWE ciphertext: c∈ $\mathbb{T}_N[X]^{(k+1)l\times(k+1)}$. The motivation for defining TGLWE and TGGSW ciphertexts is that they permit a homomorphic multiplication: TGLWE($\mu_1$) ⊡ TGGSW($\mu_2$)=TGLWE($\mu_1 \cdot \mu_2$) known as the External Product (⊡). This external product defines a multiplication between a General-LWE ciphertext and a General-GSW ciphertext. First, it decomposes each of the polynomials in the TGLWE ciphertext into l polynomials of β bits, an operation termed gadget decomposition. Next, the decomposed TGLWE ciphertext and TGGSW are multiplied to form the product of a (k+1)l-vector times a (k+1)l×(k+1)-matrix (the generalized version of GSW ciphertext). The elements of the vector and the matrix are polynomials in $\mathbb{T}_N[X]$:

$$(c_0(X)c_1(X)\ldots c_k(X))) = \underbrace{(a_0(X)a_1(X)\ldots a_{(k+1)l-1}(X))}_{1\times(k+1)l} \times \quad (1)$$

$$\begin{pmatrix} \mathcal{B}_{0,0}(X) \ldots \mathcal{B}_{0,k}(X) \\ \ddots \\ \mathcal{B}_{kl,0}(X) \ldots \mathcal{B}_{kl,k}(X) \end{pmatrix}_{(k+1)l\times(k+1)}$$

The output of dimension 1×(k+1) is again a TGLWE ciphertext encrypting $\mu_1 \cdot \mu_2$. The variables k and l are cryptographic FHE parameters.

Bootstrapping aims to reduce the noise in the ciphertext. For security reasons bootstrapping decrypts the ciphertext homomorphically inside the encrypted domain. This means that one wants to homomorphically compute b−a·s=e+μ, and more specifically, as it is "programmable" bootstrapping, one wants to additionally compute a function $f(\mu)$ on the data. To achieve this programmable bootstrapping, one first sets a "test" polynomial $F=\Sigma_{i=0}^{N-1}(i)\cdot X^i \in \mathbb{T}_N[X]$ that encodes N relevant values of the function $f$. This polynomial is then rotated with b−a·s positions by calculating $F \cdot X^{-(b-a\cdot s)}$, after which the output to the function can be found on the first position of the resulting polynomial. All of these calculations should be done without revealing the value of s. This can be achieved by first rewriting the above expression as follows:

$$F \cdot X^{-(b-a\cdot s)} = F \cdot X^{-b} \cdot \prod_{i=1}^{n} X^{a_i \cdot s_i}. \quad (2)$$

This expression can be calculated iteratively. Starting with the polynomial ACC=F·$X^{-b}$, one iteratively calculates for i=1, . . . , n:

$$ACC \leftarrow ACC \cdot X^{a_i \cdot s_i}, \quad (3)$$

which can further be rewritten, using the fact that $s_i$ is either zero or one, to $$ACC \leftarrow (ACC \cdot X^{a_i} - ACC) \cdot s_i + ACC. \quad (4)$$

As the secret $s_i$ cannot be revealed, the $s_i$ value is encoded in a TGGSW ciphertext $BK_i$, and the ACC value in a TGLWE ciphertext, after which the expression becomes:

$$ACC \leftarrow (ACC \cdot X^{a_i} - ACC) \boxdot BK_i + ACC, \quad (5)$$

Using the homomorphic multiplication ⊡ the operation expressed in equation (4) homomorphically multiplexes on the secret value $s_i$ and is known as the Controlled MUX (CMUX) operation.

Collectively, the different TGGSW ciphertexts BK1, . . . , BKn, each encrypting one secret coefficient $s_1, \ldots, s_n$, are known as the bootstrapping key elements (also called bootstrapping key coefficients), which together form a bootstrapping key. The result of the operations described above is a TGLWE accumulator ACC which is "blindly" rotated with a secret amount of b−a·s positions, from which the output TLWE ciphertext Cout can be straightforwardly extracted. A high-level overview of the computations performed during PBS in a TFHE scheme is given in the algorithm shown below.

```
      /* TLWE Ciphertext */
      input : c_in = (a_1, . . . , a_n, b)
      /* TGGSW Bootstrapping Key */
      input : BK = (BK_1, . . . , BK_n)
      /* TGLWE Test Polynomial LUT */
      input : F
      /* TLWE Ciphertext */
      output: c_out
      /* Test Polynomial LUT */
1     ACC ← init(F, b)
      /* Blind Rotation */
2     for i ← 1 to n do
      |       /* CMUX */
3     |       A_1 ← f_preprocessing(ACC, a_i)
4     |       A_2 ← A_1 ⊡ BK_i
5     |       ACC ← f_postprocessing(A_2, ACC)
6     end
7     return c_out = finalize(ACC, b)
```

A bootstrapping operation thus requires two major inputs: the input ciphertext coefficients $a_1, \ldots, a_n$ and the bootstrapping key BK comprising bootstrapping key coefficients $BK_1, \ldots, BK_n$. In each iteration i=1, . . . , n of the bootstrapping operation one element of both is required. The ciphertext coefficients $a_1$ are relatively small in size and are therefore easy to accommodate. In contrast, a bootstrapping key coefficient $BK_i \in \mathbb{T}_N[X]^{(k+1)l\times(k+1)}$ is a large matrix of up to tens of kBs. Since the full BK is typically too large to fit entirely on-chip, the elements $BK_i$ must in conventional solutions be loaded from off-chip memory for every iteration. However, at high throughput levels, the required bandwidth for $BK_i$ could easily exceed 1.0 TB/s. This is larger even than the bandwidth of HBM (High Bandwidth Memory), and thus poses a memory bottleneck. This also explains why much research effort has been spent on optimizing the memory hierarchy, often including a multi-layer on-chip memory hierarchy with a large ciphertext register file at the lowest level.

As shown above, the TFHE programmable bootstrapping mainly boils down to an iterative calculation of the external product ⊡, which is a vector-matrix multiplication where the elements are large polynomials of order N. Bootstrapping is therefore dominated by the calculation of the polynomial multiplications. An acceleration of the polynomial multiplication can be achieved through the convolution theorem:

$$c = a \times b = IFFT(FFT(a) \cdot FFT(b)) \qquad (6)$$

This allows computing these polynomial multiplications in time O(N log (N)), as the multiplication of polynomials modulo $X^N-1$ corresponds to a cyclic convolution of the input vectors. FFT-based multiplication works according to Equation (6), by converting the input polynomials $[a_0\ a_1 \ldots a_{(k+1)l-1}]$ into another representation using the FFT. In this domain the multiplication operation with polynomials $B_{i,j}$ (which are pre-computed in the FFT domain) in Equation (1) can be performed pointwise (N operations per pair in Equation (6)). The accumulation step of the vector-matrix product is preferably executed in FFT-domain. Afterwards, the result needs to be converted back to the initial representation using the inverse FFT (IFFT).

FHE schemes, however, need polynomial multiplications modulo $X^N+1$, requiring performing a negacyclic convolution rather than a conventional cyclic convolution. In a cyclic convolution (with N coefficients), coefficients that are out of bounds (at position i>N) are cycled around to the first coefficients (at position i-N). In the negacyclic convolution on the contrary, these coefficients are not only cycled around, but also negated, i.e., negative-wrapped. This negacyclic convolution has a period 2N, and thus a straightforward implementation would require 2N size FFTs.

The cost of the negacyclic FFT on real input data can be reduced in various ways. The fact that the FFT computes on complex numbers offers a first opportunity for optimization. Since the input polynomials are purely real and have an imaginary component equal to zero, real-to-complex (r2c) optimized FFTs can be used, which achieves roughly a factor of two improvement in speed and memory usage. This is the approach taken by the TFHE and FHEW software libraries, which compute size-2N r2c FFTs. Another possible optimization is to compute negacyclic FFTs, which would have a period and size of 2N, instead as a regular FFT with period and size N by using a "twisting" preprocessing step. During twisting, the coefficients of the input polynomial a are multiplied with a so-called twiddle factor, being a power of the 2N-th root of unity $\psi = \omega_{2N}$, $$\hat{a} = (a[0], \psi a[1], \ldots, \psi^{N-1} a[N-1]). \qquad (7)$$

After twisting, one can perform multiplication using a regular cyclic FFT on â, halving the required FFT size to N. A further possible optimization technique is to "fold" polynomial coefficients a [i] and a [i+N/2] into a complex number a[i]+ja[i+N/2] before applying the twisting step and subsequent cyclic size-N/2 FFT. This quarters the size of the FFT required from the original naive size-2N FFT.

Two prior art accelerators that accelerate TFHE bootstrapping are MATCHA as disclosed in the paper "*MATCHA: A fast and energy-efficient accelerator for fully homomorphic encryption over the torus*" (L. Jiang et al., ACM/IEEE DAC, pp. 235-240, 2022), and Ye et al., as disclosed in the paper "*FPGA acceleration of fully homomorphic encryption over the torus*" (T. Ye et al., IEEE HPEC, pp. 1-7, 2022).

MATCHA is built after the classical CPU approach. It includes a set of TGGSW clusters with external product cores that operate from a register file. As one result, MATCHA is bottlenecked by data movement and cache memory access conflicts. Ye et al. includes pipelined units to compute the CMUX. Each pipeline instance in Ye et al. includes and SRAM that stores a single coefficient $BK_i$. After consuming a full coefficient, the next coefficient is loaded from off-chip memory. In practice, off-chip memory bandwidth is limited, and loading the next coefficient is a main throughput bottleneck for the design.

Hence, there is a need for an improved accelerator for bootstrapping that further reduces the computational requirements and memory requirements compared to the currently known accelerator solutions.

SUMMARY OF THE INVENTION

It is an object of embodiments of the present invention to provide for a device and method for performing a bootstrapping operation in a cryptographic application with reduced memory requirements and computational burden.

The above objective is accomplished by the solution according to the present invention.

In a first aspect the invention relates to a method for performing a bootstrapping operation in a cryptographic application. The method comprises
  receiving in an accelerator one or more input ciphertexts used in the cryptographic application to be bootstrapped and iteratively processing one or more accumulator variables in function of portions of the input ciphertexts, whereby each accumulator variable is linked to one input ciphertext and each iteration step is performed for each of the one or more accumulator variables in turn;
  multiplying, within each iteration, the processed accumulator variables with a bootstrapping key element belonging to a bootstrapping key comprising a plurality of bootstrapping key elements, said bootstrapping key element taken from a bootstrapping cache memory in the accelerator,
  while performing said multiplying for each of the one or more accumulator variables in turn, loading into the bootstrapping cache memory from an external memory a next bootstrapping key element of the plurality of bootstrapping key elements to be used in a next iteration of the bootstrapping operation.

The proposed solution indeed allows performing the bootstrapping operation in an efficient way, whereby the memory bottleneck is avoided. By creating from the portions of the input ciphertexts batches it becomes possible to load the various bootstrapping key coefficients at a much slower pace than in the prior art solutions. In the invention an accumulation iteration is first completed for the whole batch and only then a next iteration with a next bootstrapping key coefficient is initiated. Hence, there is more time available for loading the (relatively large) bootstrapping key coefficients. This is one of the main advantages of the present invention.

In preferred embodiments the bootstrapping cache memory is a SRAM memory.

In some embodiments the one or more input ciphertexts are supplied from a further memory in the accelerator. Alternatively, in other embodiments, the one or more input ciphertexts are fed from an external memory.

In preferred embodiments the vector elements and/or the bootstrapping key elements and/or the accumulator variables are represented in fixed point.

In advantageous embodiments the proposed method for performing a bootstrapping operation is for use in a torus fully homomorphic encryption scheme.

In another aspect the invention relates to a program, executable on a programmable device containing instructions which, when executed, perform the method as described above.

In yet a further aspect the invention relates to an accelerator for performing a bootstrapping operation in cryptographic application. The accelerator comprises:

a preprocessing block configured to receive one or more input ciphertexts to be bootstrapped and to iteratively process one or more accumulator variables in function of portions of the input ciphertexts, whereby each accumulator variable is linked to one input ciphertext and each iteration step is performed for each of the one or more accumulator variables in turn;

an arithmetic unit configured to multiply, within each iteration, the processed accumulator variables with a bootstrapping key element belonging to a bootstrapping key comprising a plurality of bootstrapping key elements.

The accelerator further comprises a bootstrapping cache memory for storing the bootstrapping key element to be multiplied and adapted for loading into the bootstrapping cache memory a next bootstrapping key element of the plurality of bootstrapping key elements to be used in a next iteration of the bootstrapping operation, while performing the multiplying operation for each of the one or more accumulator variables in turn.

In a preferred embodiment the arithmetic unit comprises a plurality of cascaded computational stages, where each computational stage is concurrently operable on different parts or different operations related to the one or more accumulator variables.

Advantageously, the plurality of cascaded computational stages form a pipeline.

In a preferred embodiment a fixed point representation is used for the vector elements and/or the bootstrapping key element and/or the accumulator variables.

In some embodiments the bootstrapping cache memory is arranged for storing more than one next bootstrapping key element to be used.

In advantageous embodiments the accelerator is implemented on a Field Programmable Gate Array or in an application specific integrated circuit (ASIC). In one embodiment the accelerator is implemented on an FPGA and optimized to make efficient use of digital signal processing (DSP) units, lookup tables (LUTs) and block RAMs (BRAMs) in the FPGA fabric. In some embodiments the accelerator is implemented completely in software.

In some embodiments the arithmetic unit has forward and inverse FFT or NTT computational stages, with the forward FFT or NTT having a higher throughput than the inverse FFT or NTT.

In one aspect the invention relates to a computing system comprising an accelerator as described above and a memory external to the accelerator, wherein the memory is arranged to store one or more bootstrapping keys for use in the bootstrapping operation.

In another aspect the invention relates to the use of an accelerator as described above in a cloud computing service.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
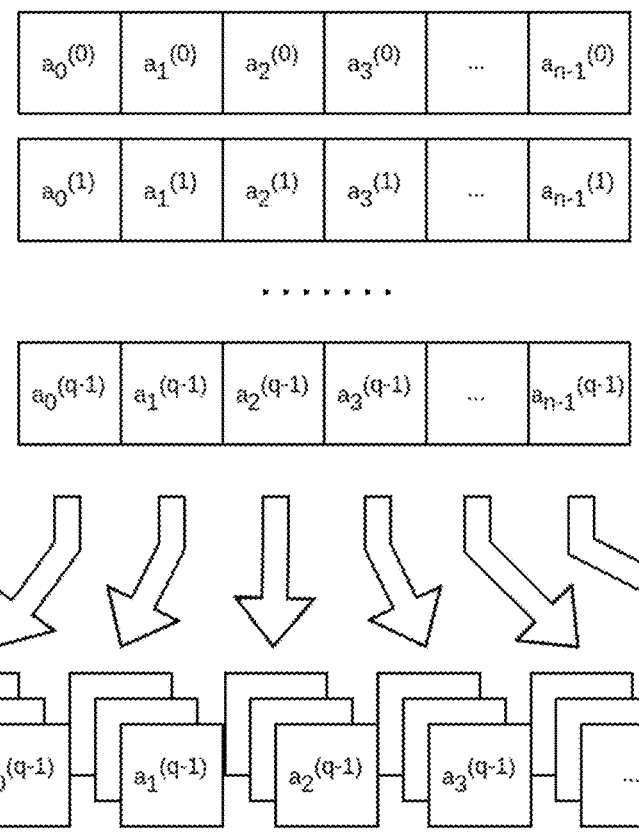
FIG. 1 illustrates the creation of a batch from a plurality of ciphertext portions.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

From the introduction it has already become clear that in a cryptographic application there is a need for a method and device for accelerating a bootstrapping operation.

The present invention discloses in a first aspect a method for performing a bootstrapping operation based on a Fully Homomorphic Encryption (FHE) scheme. In advantageous embodiments the scheme is a Torus FHE scheme (TFHE). The invention proposes an approach to amortize loading the bootstrapping key element for each iteration of the bootstrapping process. The bottleneck of the required huge memory bandwidth encountered when performing bootstrapping in prior art schemes is so overcome.

In a further aspect the invention proposes an accelerator device with an architecture adapted to carry out the novel bootstrapping approach. In preferred embodiments the accelerator is implemented on a Field Programmable Gate Array (FPGA). In one embodiment the accelerator is implemented on an FPGA and optimized to make efficient use digital signal processing (DSP) units, lookup tables (LUTs) and block RAMs (BRAMs) in the FPGA fabric. In alternative embodiments an ASIC implementation of the accelerator is provided. In some embodiments, the accelerator implemented on an FPGA or ASIC is made available as a cloud computing instance.

The proposed approach is based on the inventors' observation that the memory bottleneck problem can be solved or at least mitigated by processing various portions of ciphertext to be treated in the cryptographic application in batches of a predefined size q, whereby vector elements are gathered that are used in the same iteration step and thus require the same bootstrapping key coefficient $BK_i$ of the bootstrapping key. In preferred embodiments the value of q is between 8 and 32, but the invention is obviously not limited thereto. Hence, assuming q ciphertexts, each with n portions, each batch is represented by a vector comprising q portions of ciphertext $a_i^{(0)}, a_i^{(1)}, \ldots, a_0^{(q-1)}$ with $i=0, 1, \ldots, n-1$. In a first iteration (i=0), for example, the batch comprises the following q elements, which are processed in the iteration using $BK_0$: $\{a_0^{(0)}, a_0^{(1)}, \ldots, a_0^{(q-1)}\}$. In a next iteration of the bootstrapping operation (i=1) a batch of vector elements $\{a_1^{(0)}, a_1^{(1)}, \ldots, a_1^{(q-1)}\}$ is then used which are each used in the iteration with bootstrapping key element $BK_1$, and so on. In general, the accumulation iteration i (equation 5) is first completed for all elements in a batch before moving to iteration i+1:

$$ACC^j \leftarrow (ACC^j \cdot X^{a_i^j} - ACC^j) \boxtimes BK_i + ACC^j \, j = 0, \ldots, q-1$$

More details are provided later in this description. FIG. 1 provides an illustration of the batch creation from a set of ciphertexts. An internal variable ACC that is first multiplied with $x^{a_i^j}$ and then multiplied with the bootstrapping key, is referred to as an accumulator variable.

The bootstrapping key element (i.e., the coefficient) $BK_i$ is stored in an on-chip bootstrapping cache memory. While the multiplication of the respective vector elements $a_i^{(j)}$ with the bootstrapping key element $BK_i$ is being performed, the next bootstrapping key element $BK_{i+1}$ to be used in the next iteration of the bootstrapping procedure is loaded into the on-chip internal bootstrapping cache memory from an off-chip external memory. By working on batches comprising elements from different portions of ciphertext there is much more time available for loading a next bootstrapping key element into the on-chip cache memory, namely the amount of time it takes for performing q times a multiplication of an accumulator variable of the batch being processed with the corresponding bootstrapping key element. In contrast, in the prior art solutions, the time available for loading a bootstrapping key element was as short as the time for multiplying a single accumulator variable with a bootstrapping key element. This is the basic insight on which the proposed method is founded. In one aspect the invention relates to an accelerator having an architecture adapted for carrying out the method. Using the small bootstrapping cache memory the programmable bootstrapping remains entirely compute-bound. A huge programmable bootstrapping throughput can be achieved that requires only modest off-chip memory bandwidth to load the set of bootstrapping key elements of the bootstrapping key.

Figure 2:
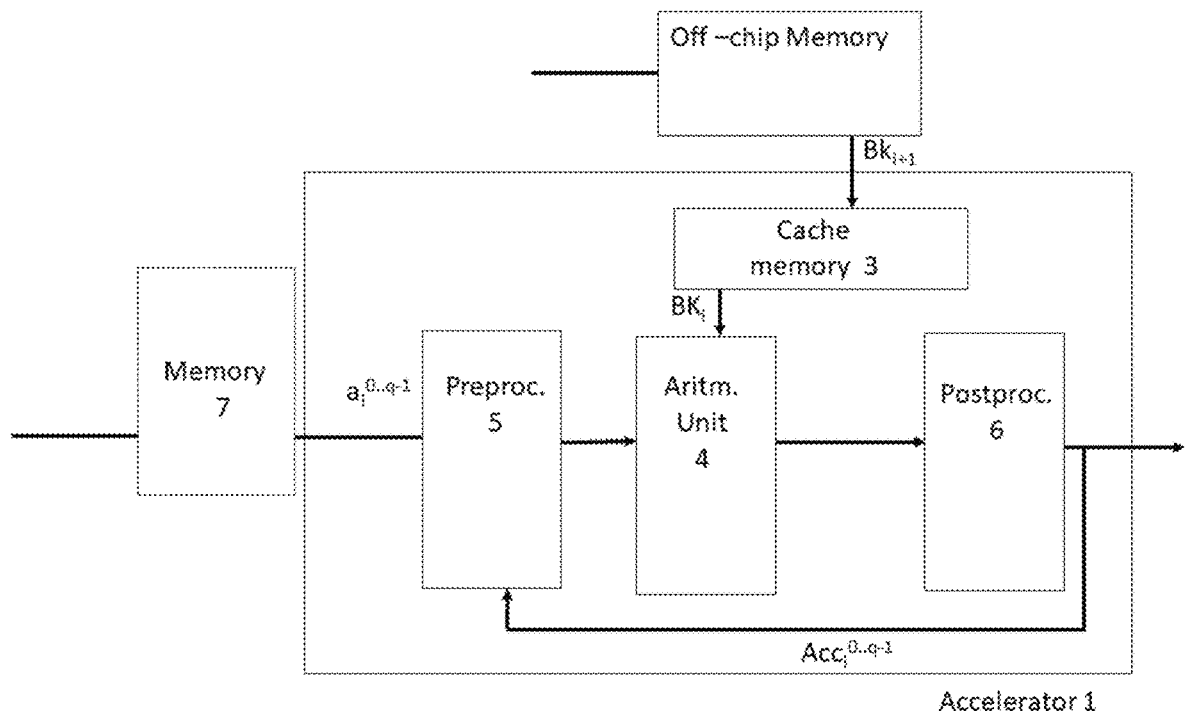
FIG. 2 illustrates a general block scheme of an embodiment of an accelerator according to the present invention.

The accelerator micro-architecture adapted for performing the method of the invention is now presented more in detail. FIG. 2 shows a basic block scheme of an accelerator 1 according to this invention. The main computation is performed in a loop that is iterated a given number of times (typically n times, once for each of the n coefficients in a ciphertext). In the loop the accumulator variables move around, from the preprocessing block 5 to the arithmetic unit 4 and the postprocessing unit 6 and back to the preprocessing block to start the subsequent iteration. The computational units are preferably pipelined and data related to the q different portions of ciphertext that are batched, are spread over the computational units.

The accelerator 1 comprises a preprocessing block 5, where some preprocessing is performed for each iteration: the various portions of ciphertext $a_i^{(j)}$ that together constitute the q public elements $a^{(j)}$, j=0, ..., q-1, are fed to this block where coefficient $a_i^{(j)}$ comprising data relating to ciphertext j is used in iteration i. The ciphertext coefficients are relatively small in size and therefore easy to accommodate. The whole set of public vectors $a_i^{(j)}$, j=0 ... q-1, i=1 ... n is preferably communicated from the software application to the accelerator through a memory 7. This memory can be either on-chip or off-chip. However, this does not necessarily have to be the case. The data can also be sent to be directly consumed by the accelerator, without intermediate memory. Preferably all coefficients a) related to the same $BK_i$ are brought together in a single batch. Creating these batches can be done in the accelerator, for example by reading from the memory 7 with interleaved read addresses. Alternatively, batches can be created in the software application, and the data is communicated to the accelerator already in batched form.

The bootstrapping key elements are larger in size than the ciphertext portions. In preferred embodiments, the various bootstrapping key elements $BK_i$ are stored in off-chip SDRAM memory. In some embodiments, the off-chip SDRAM memory is DDR (Double-Data Rate) SDRAM. In other embodiments, the off-chip memory is HBM (High-Bandwidth Memory) SDRAM.

As shown in FIG. 2, the device 1 further comprises as processing element an arithmetic unit 4 that takes care of making the product (i.e., the external product of the output of the preprocessing block with the respective bootstrapping key ⊡) elements $BK_i$. The device further comprises a small bootstrapping cache memory 3 arranged for storing at least two bootstrapping key elements. The bootstrapping key element $BK_i$ for use in the external product in iteration i is taken from the on-chip bootstrapping cache memory 3. This can be a SRAM memory in some embodiments. In an implementation on a Field Programmable Gate Array (FPGA), the SRAM memory can be constructed using Block RAMs (BRAM) or Ultra RAMs (URAM). The bootstrapping cache memory 3 has a size large enough for loading at least one further bootstrapping key element while another bootstrapping key element is being used in the multiplication operation. In such embodiments, where the cache memory holds two bootstrapping key elements, the loading may be performed in a ping-pong fashion. In some embodiments the cache memory size is sufficient for storing more than one further bootstrapping key element being loaded. This may be advantageous, for example to buffer latency and throughput differences between the on-chip cache memory and the off-chip memory. In these embodiments, loading of the bootstrapping key elements can be performed in a first-in first-out fashion.

The accelerator further comprises a postprocessing block 6 wherein the outcome of the multiplication is received and postprocessed to prepare it for the next iteration. The latter result is then again applied to the preprocessing block to start iteration i+1.

The accelerator operates as follows. During initialization, the input of the preprocessing block is set to a carefully chosen value (possibly depending on an external input). In some embodiments this value equals the $F \cdot X^{-b}$ from expression (2). In other embodiments the value may be just F while the multiplication with X-b is only performed at the end. To perform the computation, in each iteration i a different a and BK are used. While iteration i is being computed, $BK_{i+1}$ is already loaded to prepare for the next iteration. After a certain number of iterations (for example, but not necessarily, n), the output of the postprocessing block is returned, possibly after calculating a final output processing.

As already mentioned above, the process is performed in a batched fashion. The whole of the iteration (i.e., preprocessing to collect input coefficients, multiplication in the arithmetic unit and postprocessing to accumulate intermediate results of multiplying operation) is pipelined and computations are performed on q ciphertext coefficients $a_i^{(j)}$, j=0, ..., q-1, which are batched in one iteration, leading to q accumulator variables $ACC^{(j)}$. This means that in one iteration, all q ciphertext coefficients are handled before moving to the next iteration. In each iteration i, all q accumulator variables $ACC^{(j)}$, j=0, ..., q-1, are multiplied with the same $BK_i$, saving on memory and bandwidth. However, the $a_i^{(j)}$ and $ACC^{(j)}$ can be and typically are different for each of the q ciphertexts. As the size of the $a_i$ is typically much smaller than the size of the $BK_i$, and since the ACC variables remain on-chip, this is not a heavy burden for the bandwidth and memory.

Figure 3:
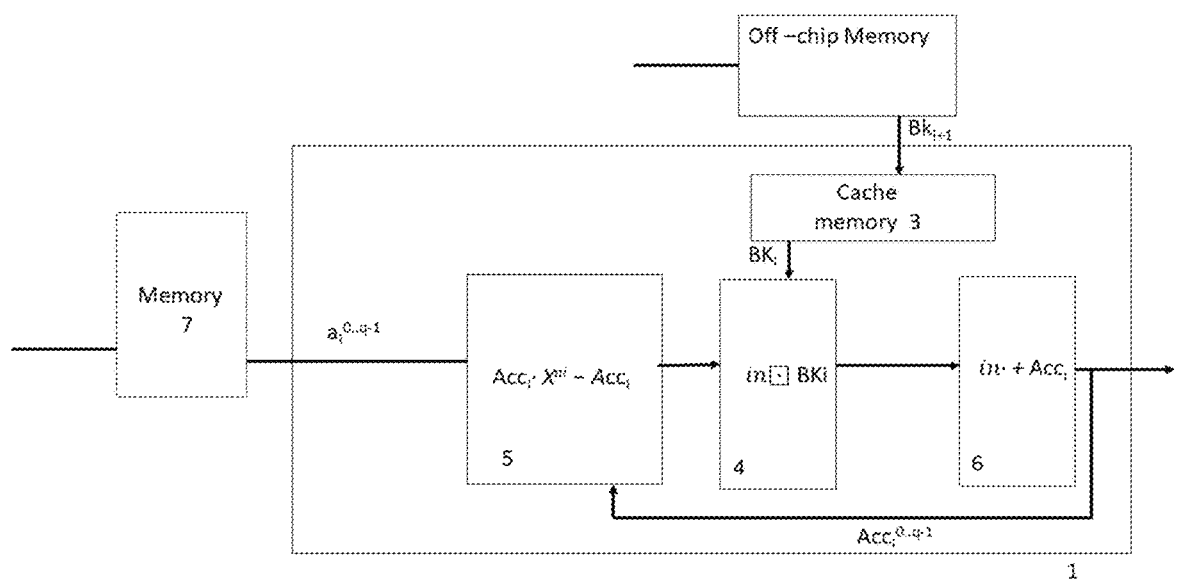
FIG. 3 illustrates a more detailed view on a possible advantageous implementation of an accelerator according to the invention, where the method for performing a bootstrapping operation is for use in a torus fully homomorphic encryption scheme.

FIG. 3 illustrates a preferred embodiment, where the cryptographic application is a torus fully homomorphic encryption (TFHE) scheme. The accelerator is then adapted to carry out the controlled MUX (CMUX) operation based on the above-mentioned expression (5), where $a_i$ takes in an iterative way the various values $a_i^{(j)}$ in the batch. That is, the preprocessing block computes $in*X^{a_i}-in$, the arithmetic unit computes the external product ⊡, and the postprocessing block computes (in+acc), where in denotes the output of the external product in that iteration. It is to be noted that in a practical implementation, other computational blocks may be needed apart from those for the TFHE scheme. In some embodiments with an TFHE scheme, the final output processing may include a key switching operation, where the outputs encrypted under a certain given key, are transformed to ciphertexts encrypted under a different secret key. The key switching operation can be performed either before or after the bootstrapping operation.

The accelerator is in preferred embodiments built as a streaming processor with wide data paths and massive throughput. In some embodiments the accelerator has a pipeline structure comprising a plurality of high-throughput computational stages that are directly cascaded, with, compared to prior art solutions, simplified control logic and routing networks. In this architecture, data flows directly from one computational stage to the next, without being read from/written to a central memory. Such design allows for a highly efficient utilization of the arithmetic units in the various computational stages during the bootstrapping process. In an alternative embodiment the accelerator is built following a more CPU like approach where the arithmetic units get and write data to memory.

The accelerator computes a fixed sequence of preprocessing, arithmetic (i.e., an external product), and post-processing. Rather than dividing the accelerator into sub-units for each of the operations where the sub-units are sequenced to run from a register file, the accelerator according to embodiments of the invention builds the fixed sequence with directly cascaded computational stages. Stages are throughput-balanced in a conceivably simple way: each stage operates at the same throughput and processes a number of polynomial coefficients per clock cycle that is called the streaming width. Stages are interconnected in a simple fixed pipeline with static latency, avoiding complicated control logic and simplifying routing paths.

The accelerator is built to achieve a bootstrapping throughput as high as possible. The preferred optimisation metric is Throughput/Area (TP/A). A design with a smaller throughput, but a larger TP/A, can achieve the best throughput by instantiating multiple copies. In general, the Throughput/Area (TP/A) of computational stages increases together with the streaming width. This is a motivation to instantiate in one embodiment only a single accelerator with high streaming width, as opposed to many accelerators with smaller streaming widths.

Figure 4:
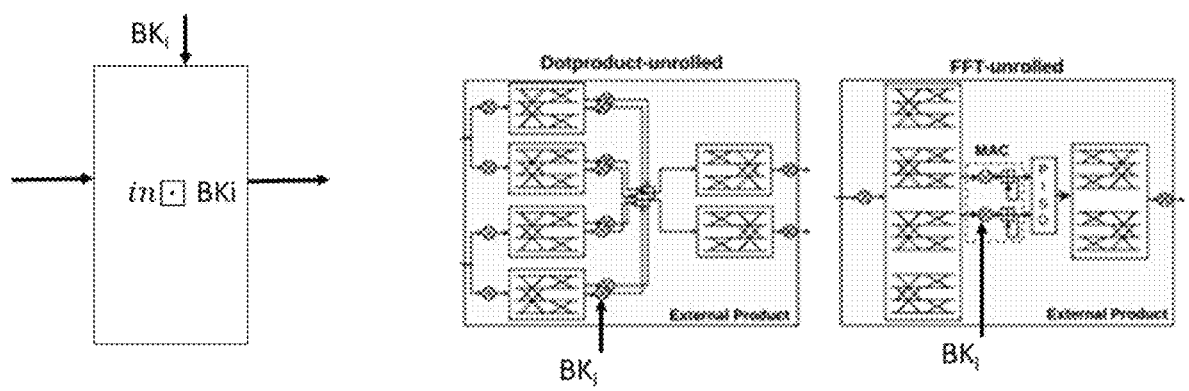
FIG. 4 illustrates two possible options for realizing the external product.

In some embodiments of the accelerator the arithmetic unit comprises (k+1) l (with k,l cryptographic parameters) forward FFT operations, but only (k+1) inverse FFT operations. To obtain a design with maximal utilization, the FFT and IFFT throughputs of the processing element need to be balanced. In some embodiments, this balancing is achieved by instantiating FFT units having higher throughput than IFFT units. Two possible options to achieve higher throughput is by instantiating/times more FFT building blocks than IFFT building blocks (this can be seen as a dotproduct-unrolled architecture), or by instantiating FFT blocks with l times the larger streaming width (which can be seen as an FFT-unrolled architecture). FIG. 4 illustrates these two options for computing the external product in the arithmetic unit.

The dotproduct-unrolled architecture (left) represents the more obvious choice for parallelism. In the FFT-unrolled architecture (right) throughput is balanced by instantiating the FFT with l times the streaming width of the IFFT. These two options exploit different types of "loop unrolling" inside the external product. In the former, first the dotproduct is loop-unrolled before unrolling the FFT, while in the latter, the FFT is loop-unrolled maximally. The FFT-unrolled architecture is more complex than the dotproduct-unrolled one. First, multiply-add operations must be replaced by MACs, since polynomial coefficients that must be added are now spaced temporally over different clock cycles. Second, the inverse FFT can only start processing once a full MAC has been completed, requiring a Parallel-In Serial-Out (PISO) block that double-buffers the MAC output and matches throughputs. Third and most importantly, FFT blocks can be challenging to unroll and implement for arbitrary throughputs, and supporting two FFT blocks with differing throughputs requires extra engineering effort. On the other hand, the FFT-unrolled architecture features fewer FFT units that can therefore utilize higher streaming widths. This favours the general (and often-neglected) trend of pipelined FFTs, which typically feature a significantly higher Throughput/Area ratio as the streaming width increases. At the most extreme end, a fully parallel FFT is a circuit with only constant multiplications and fixed routing paths, featuring up to 300% more throughput per DSP or per LUT on an FPGA.

The arithmetic unit computes a number of polynomial multiplications and accumulations. To achieve high efficiency, these polynomial multiplications can be performed using an FFT or NTT algorithm. In some embodiments of the accelerator the forward FFT or NTT has a higher throughput than the inverse FFT or NTT. The algorithms can be implemented in an iterative or pipelined fashion. In a preferred embodiment a pipelined FFT is instantiated that comprises log (N) stages connected in series. The main advantage of these architectures is that they process a continuous flow of data, which lends itself well to a fully streaming external product design.

The vector elements and/or bootstrapping keys can be represented in various ways, e.g., in floating point notation (with single precision or double precision), block floating point or fixed point notation when using the FFT, or in integer notation when using the NTT. In advantageous embodiments the vector elements and/or the bootstrapping keys are represented in a fixed point notation and the accelerator uses the FFT. A fixed point representation is determined by the number of bits in the representation and by the scaling factor. In a fixed point representation, the mantissa has a fixed number of bits.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for performing a bootstrapping operation in a cryptographic application, comprising
   receiving in an accelerator one or more input ciphertexts used in the cryptographic application to be bootstrapped and iteratively processing one or more accumulator variables in function of portions of the input ciphertexts, whereby each accumulator variable is linked to one input ciphertext and each iteration step is performed for each of the one or more accumulator variables in turn;
   multiplying, within each iteration, the processed accumulator variables with a bootstrapping key element belonging to a bootstrapping key comprising a plurality of bootstrapping key elements, said bootstrapping key element taken from a bootstrapping cache memory in the accelerator,
   while performing said multiplying for each of the one or more accumulator variables in turn, loading into the bootstrapping cache memory from an external memory a next bootstrapping key element of the plurality of bootstrapping key elements to be used in a next iteration of the bootstrapping operation,
   wherein the cryptographic application is a torus fully homomorphic encryption scheme.

2. The method for performing a bootstrapping operation as in claim 1, where the bootstrapping cache memory is a SRAM memory.

3. The method for performing a bootstrapping operation as in claim 1, wherein said one or more input ciphertexts are supplied from a further memory in the accelerator.

4. The method for performing a bootstrapping operation as in claim 1, wherein said one or more input ciphertexts are supplied from an external memory.

5. The method for performing a bootstrapping operation as in claim 1, wherein the vector elements and/or the bootstrapping key elements and/or said accumulator variables are represented in fixed point.

6. A program, executable on a programmable device containing instructions comprising a memory, and which, when executed, perform the method as in claim 1.

7. An accelerator comprising a processor and a non-transitory computer readable medium storing instructions for performing a bootstrapping operation in cryptographic application when executed by the processor, the accelerator comprising;
 a preprocessing block configured to receive one or more input ciphertexts to be bootstrapped and to iteratively process one or more accumulator variables in function of portions of the input ciphertexts, whereby each accumulator variable is linked to one input ciphertext and each iteration step is performed for each of the one or more accumulator variables in turn;
 an arithmetic unit configured to multiply, within each iteration, the processed accumulator variables with a bootstrapping key element belonging to a bootstrapping key comprising a plurality of bootstrapping key elements,
 wherein the accelerator further comprises a bootstrapping cache memory for storing the bootstrapping key element to be multiplied and adapted for loading into the bootstrapping cache memory a next bootstrapping key element of said plurality of bootstrapping key elements to be used in a next iteration of the bootstrapping operation, while performing the multiplying operation for each of the one or more accumulator variables in turn,
 wherein the cryptographic application is a torus fully homomorphic encryption scheme.

8. The accelerator as in claim 7, wherein the arithmetic unit comprises a plurality of cascaded computational stages, where each computational stage is operating on different parts of said one or more accumulator variables.

9. The accelerator as in claim 7, wherein the plurality of cascaded computational stages forms a pipeline.

10. The accelerator as in claim 7, comprising a memory for storing said one or more input ciphertexts.

11. The accelerator as in claim 7, wherein a fixed point representation is used for the one or more input ciphertexts and/or the bootstrapping key element and/or the accumulator variables.

12. The accelerator as in claim 7, wherein the bootstrapping cache memory is arranged for storing more than one next bootstrapping key element to be used.

13. The accelerator as in claim 7, implemented on a Field Programmable Gate Array or in an application specific integrated circuit.

14. The accelerator as in claim 7, wherein the arithmetic unit has forward and inverse FFT or NTT computational stages, with the forward FFT or NTT having a higher throughput than the inverse FFT or NTT.

15. A computing system comprising an accelerator as in claim 7 and a memory external to the accelerator, said memory arranged to store one or more bootstrapping keys for use in the bootstrapping operation.

16. Use of an accelerator as in claim 13 in a cloud computing service.

* * * * *